US005876794A

United States Patent [19]

Huet

[11] Patent Number: 5,876,794

[45] Date of Patent: Mar. 2, 1999

[54] PROCESS FOR ATOMIZING A DISPERSIBLE LIQUID MATERIAL

[76] Inventor: Daniel Huet, 309 Chemin des Petites-Roches, 38330 Saint-Ismier, France

[21] Appl. No.: 765,375

[22] PCT Filed: Jun. 21, 1995

[86] PCT No.: PCT/FR95/00824

§ 371 Date: Apr. 14, 1997

§ 102(e) Date: Apr. 14, 1997

[87] PCT Pub. No.: WO95/35158

PCT Pub. Date: Dec. 28, 1995

[30] Foreign Application Priority Data

Jun. 21, 1994 [FR] France .................................. 94 07562

[51] Int. Cl.[6] ................................ B05D 7/00; B05D 1/06

[52] U.S. Cl. .......................... 427/214; 427/215; 427/216; 427/217; 427/426; 427/427

[58] Field of Search .................................... 427/189, 214, 427/426, 215, 216, 217, 190, 191, 193, 427

[56] References Cited

U.S. PATENT DOCUMENTS

| | | | |
|---|---|---|---|
| 3,991,225 | 11/1976 | Blouin | 427/215 |
| 4,087,572 | 5/1978 | Nimerick | 427/215 |
| 4,407,450 | 10/1983 | Chegolya et al. | 239/8 |
| 4,969,955 | 11/1990 | Rudin | 427/212 |
| 5,153,030 | 10/1992 | Chatfield et al. | 427/215 |

*Primary Examiner*—Shrive Beck
*Assistant Examiner*—Bret Chen
*Attorney, Agent, or Firm*—Hill & Simpson

[57] ABSTRACT

The invention relates to a process for atomizing a dispersible liquid material or a mixture of dispersible liquid materials, characterized in that the dispersible liquid material (3) or the mixture is dispersed in the form of particles (7) by spraying at least one stream of solid particles (6) which are reactive as a result of their partial or total coating onto the material and the particles (7) are collected in a receiving medium.

33 Claims, 3 Drawing Sheets

PROCESS FOR ATOMIZING A DISPERSIBLE LIQUID MATERIAL

BACKGROUND OF THE INVENTION

The invention relates to a process for atomizing a dispersible liquid material or a mixture of dispersible liquid materials.

At the present time, most metal powders are manufactured by various atomization processes. The principle underlying these processes is often the same: a liquid metal placed in a distributor is forced through a nozzle to obtain a thin jet which is dispersed in the form of particles by the rapid motion of a gas or of a stream of liquid.

Three classes of atomization processes can be distinguished. According to a first class, the liquid metal, in most cases, is atomized at the time of the casting. In a particular case of the process, the disintegration of the liquid into particles is produced by the mechanical action of a rotating disc, but, in general, the atomization is produced by air, gas, water and under vacuum by bursting of the liquid due to a great pressure difference. Spraying of solid particles has also been mentioned, but so far has been limited to the agglomeration of, or the introduction with, the dispersible liquid material.

Another class of process has been developed a little more recently. This is atomization by centrifugal force which is applied according to two variants: either the melting electrode forms the starting material for obtaining the particles, or the distributor containing the liquid is subjected to a rotation which causes the ejection of the liquid in the form of drops against the cooled walls of a plant, thus enabling a powder to be recovered.

Finally, a last class consists of processes employing ultrasonics, a vibrating electrode and cooled rolls which rotate.

Nevertheless, while the known atomization processes of the state of the art exhibit advantages which are not insignificant, such as, especially, obtaining very dense and homogeneous particles with a good purity and an efficient control of the composition, in most cases they require a number of parameters to be controlled at the same time, which makes the use of the processes difficult.

Thus, the atomization process is determined by the geometry of the system, namely: the diameter of the orifice (and therefore the diameter of the liquid jet), the geometry of the tuyere for injecting the atomizing agent (the stream velocity), the angle formed between the jet and the stream, the path length of the particles and the distance between the jet and the stream. All these constraints require sufficient knowledge of metallurgy in order to gain control and properly monitor the bath of liquid metal.

Furthermore, the atomization of metals presents the problem of transformations which can take place during the rapid cooling of a molten drop. Thus, in the case of some alloys—for example Cu/Pb—a more fusible phase may be situated owing to segregation in the core of the drop. A difference in composition may also appear between the particles of different sizes.

Furthermore, it is sometimes difficult to atomize a metal which is highly reactive to water (for example zirconium) in order to obtain a division in the range from 1 to 25 mm while retaining a solid particle form.

It is also very difficult for lightweight molten materials such as silicon, aluminium and their alloys to enter the water jet, and atomization with water is found to be inefficient. In both these cases it is necessary to resort to techniques of atomization with gas, which technique are sophisticated and costly.

In the case of an atomization using air or gas, the rapid cooling can also result in the occlusion of the gas in the particle. In the case of some alloys, even quenching structures are observed, resulting in the need to reheat the powders before they are shaped.

Finally, the particle size spectrum is generally quite wide, the production of a more uniform particle size requiring very strict control over the processes involved.

SUMMARY OF THE INVENTION

One objective of the present invention is therefore to provide a process for atomizing a dispersible liquid material, which overcomes the disadvantages or limitations of the known processes of the state of the art.

More particularly, an objective of the present invention is to provide a process for atomizing a dispersible liquid material, which makes it possible to control the particle size of the particles obtained and to restrict the particle size spectrum so as to obtain a more uniform particle size, this being whatever the dispersible liquid material employed.

Another objective of the present invention is to provide such a process which makes it possible to obtain fine particles, especially 0.02 to 0.6 mm in diameter, with a good energy efficiency and a high production efficiency.

Another objective of the present invention is to provide such a process in which there is no immediate cooling of the atomized liquid material, so as to enable these particles to undergo possible complementary atomizations.

Another objective of the present invention is to provide such a process which makes it possible to atomize a lightweight dispersible liquid material at low cost in the particle size range from 0.5 to 25 mm.

Another objective of the present invention is to provide such a process which is, in combination, simple to use, reliable, nonpolluting and economical in energy.

To this end the invention relates to a process for atomizing a dispersible liquid material or a mixture of dispersible liquid materials, characterized in that the dispersible liquid material or the mixture is dispersed in the form of particles by spraying at least one stream of solid particles which are reactive as a result of their partial or total coating onto the said material and the particles of dispersible material are collected in a receiving medium.

According to another characteristic the film or the drops at the surface of the solid particles are reactive near or in contact with the dispersible liquid material as a result of their evaporation, their sublimation, a violent or explosive chemical reaction or an electrical and/or magnetic interaction.

A process in accordance with the present invention also can include the following characteristics, taken by themselves, in combination or optionally: the stream of solid particles is sprayed onto the surface of a bath of the dispersible liquid material, onto the outflow by overspill of a bath of the material, onto a jet of the material, obtained by outflow through an orifice or equivalent, under immersion in a bath of the material; the process in accordance with the present invention includes an additional step consisting of a step of atomization using water, gas, under vacuum, on a cone, a sheet or a drum, by centrifuging, explosion or equivalent, this additional step being performed before or after the process in accordance with the present invention.

Other characteristics and advantages of the present invention will appear on reading the description which follows, with reference to the attached drawings.

DETAILED DESCRIPTION OF THE PRESENTLY PREFERRED EMBODIMENT

Figure 1:
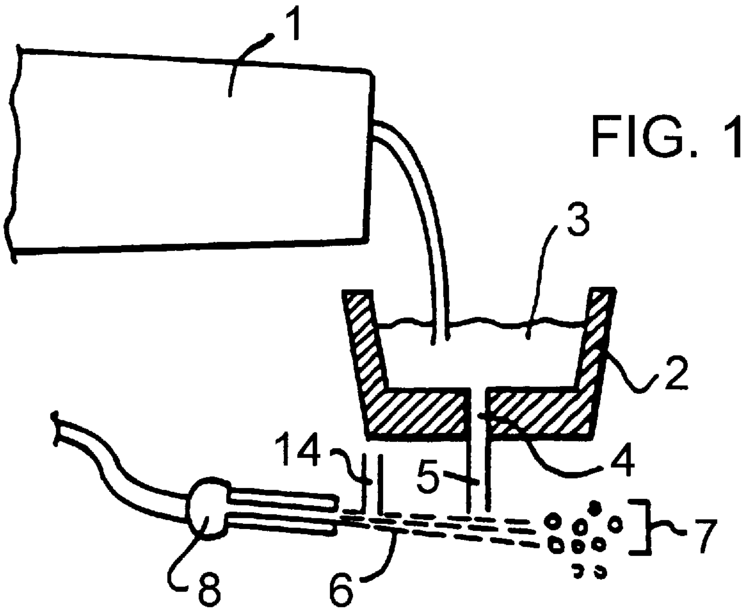
FIG. 1 is a diagrammatic view, in section, of a first alternative form of a plant for making use of the process in accordance with the present invention.

The invention therefore relates to a process for atomizing a dispersible liquid material. In the present description a dispersible liquid material is intended to mean any material that is liquid at ambient temperature or at a temperature higher than the ambient temperature. Such a material includes especially water, a metal, an alloy or a synthetic (for example thermoplastic) substance, for alimentary, pharmaceutical, cosmetic, agricultural or similar use. In the case where the dispersible liquid material is a metal, the latter may be chosen from the group consisting of zirconium, aluminium, silicon or one of their alloys. This material may also be in the form of a mixture. In the description which precedes or which follows, the term "dispersible liquid material" should be understood to be a single material or a mixture of materials.

For convenience, in the description which follows, reference will be made to steel as a dispersible liquid material, but it should be understood that the process in accordance with the present invention is not limited to such a material.

Alternative forms of plants for making use of the process in accordance with the invention are shown in FIGS. 1 to 6. Such plants, which are conventional in the field of atomization, comprise a channel 1 intended for the conveying of the dispersible liquid material 3 and overhanging a distributor or tundish 2.

According to the invention, the atomization process is characterized in that the dispersible liquid material 3 is dispersed into the form of particles 7, by spraying at least one stream of reactive solid particles onto the material and the particles 7 are collected in a reception medium.

Reactive solid particles 6 are intended here to mean solid particles which are coated, completely or partially, before or during their spraying onto the dispersible liquid material 3, with a more or less thick layer or with more or less fine drops or droplets whose nature will increase the in-situ dispersion of the liquid material, by a rapid expansion as a result of their vaporization or sublimation or by a violent or explosive chemical reaction or by electrical and/or magnetic action. The advantage of the process of the invention is: by producing a tight meshing as a result of the passage of the flow of reactive solid particles it is possible to control completely the particle size of the dispersed material by gaining full control of the reactivity within the dispersible material. The film or the drops at the surface of the solid particles are reactive near or in contact with the dispersible liquid material, as a result of their evaporation, their sublimation, of a violent or explosive chemical reaction or of an electrical and/or magnetic interaction.

In the description which follows, reference will be made to the term "solid particle", but it should be understood that this term includes all reactive solid particles.

One of the advantages of the process of the invention is its very great flexibility in use. In fact, this process can be adapted to any type of already existing atomization plant. Depending on the latter and on the specification to be met by the operator, one or other of the alternative forms shown in FIGS. 1 to 6 will be employed.

In the majority of the existing atomization plants the dispersible liquid material is forced through an orifice 4 so as to obtain a thin jet 5 of a diameter or a thickness that is smaller than approximately 20 mm, for example, in the case of steel.

Figure 2:
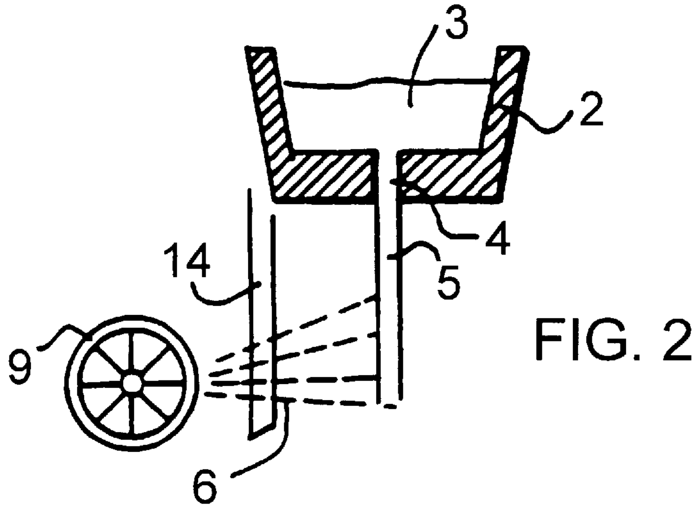
FIG. 2 is a diagrammatic view, in section, of a second alternative form of a plant for making use of the process in accordance with the present invention.
Figure 4:
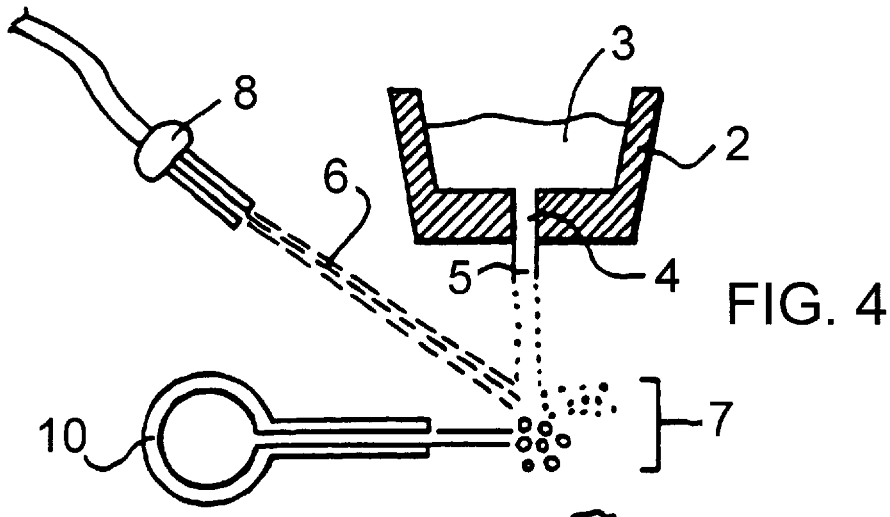
FIG. 4 is a diagrammatic view, in section, of a fourth alternative form of a plant for making use of the process in accordance with the present invention.

According to the invention the stream of solid particles 6 is sprayed onto the jet 5 of the dispersible liquid material 3 obtained by the outflow of the material through the orifice 4 (FIGS. 1, 2, 4).

The spraying of the stream of solid particles 6 may also be performed on the conical dispersion of the jet 5 of a liquid material, obtained by interposing a cone 13 in the path of the jet. Obviously, the cone 13 may be replaced by any equivalent means, such as a sheet or a drum.

Figure 3:
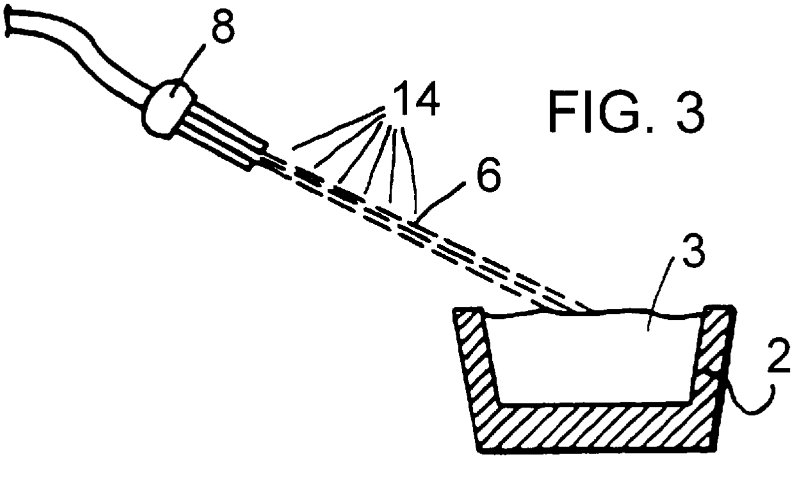
FIG. 3 is a diagrammatic view, in section, of a third alternative form of a plant for making use of the process in accordance with the present invention.
Figure 5:
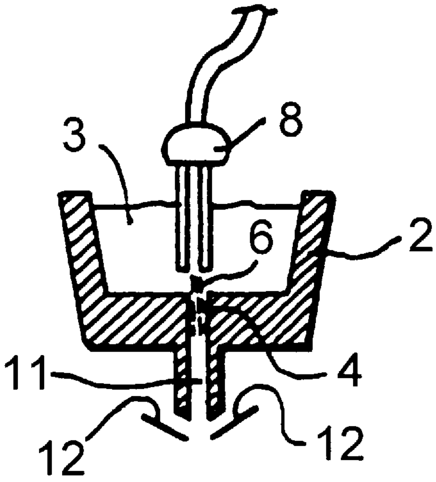
FIG. 5 is a diagrammatic view, in section, of a fifth alternative form of a plant for making use of the process in accordance with the present invention.

However, the spraying of the stream of solid particles 6 may also be performed onto the outflow by overspill of a bath of dispersible liquid material, onto the surface of the bath of the dispersible liquid material and under immersion in the bath of the dispersible liquid material 3 as shown, respectively, by FIGS. 3 and 5.

The process in accordance with the present invention can also comprise an additional step consisting of a conventional step of atomization using water, gas, under vacuum, on a cone, a sheet or a drum, by centrifuging, explosion or the equivalent.

This additional step may take place either before or after the spraying of the stream of solid particles 6.

Thus, in FIG. 4, the jet 5 of dispersible liquid material 3 undergoes a first atomization by means of a stream of solid particles 6. This first atomization produces a mixture of particles 7 of the liquid material, especially of fine particles and of coarser particles.. These coarse particles are then subjected to a second atomization by means of a water compressor 10 which propels water at a pressure approximately of 0.8 to 1.2 bars, since a pressure higher than 1.2 bars deforms the particles.

In FIG. 5 the first atomization by spraying a stream of solid particles 6 is performed by immersion in the bath of dispersible liquid material 3. The atomized particles pass through the orifice 4 and then a nozzle 11 and are subjected to a second atomization by a gas stream (air or inert gas) originating from an annular tuyere 12.

Figure 6:
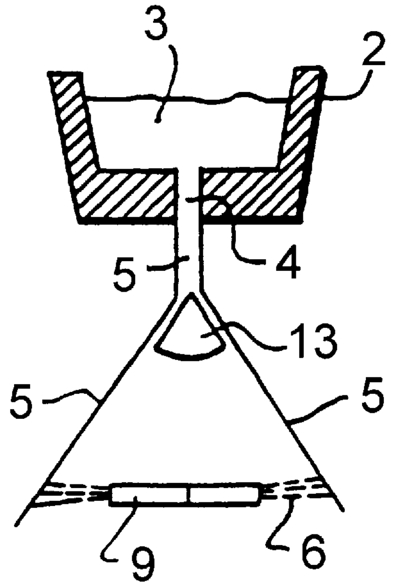
FIG. 6 is a diagrammatic view, in section, of a sixth alternative form of a plant for making use of the process in accordance with the present invention.

Another alternative form of the process in accordance with the present invention is shown in FIG. 6, in which the atomization by spraying a stream of solid particles 6 takes place after a first atomization performed by means of a cone 13.

From all that precedes it will be understood that the process in accordance with the present invention offers very great flexibility in use since, depending on the desired results and constraints linked with the environment of the atomization plant the stream of solid particles 6 can be sprayed at an incidence which is glancing to perpendicular in relation to the free surface of the dispersible liquid material 3. A number of streams of solid particles 6, of the same kind or of a different kind, can also be sprayed successively or simultaneously. According to the spraying means employed, it is also possible to spray the stream of solid particles 6 at points or over a great length or area of the liquid material 3.

With regard to the means for spraying the stream of solid particles 6, they include means of spraying using gravity, a turbine 9 or any other appropriate mechanical means, the speed of the solid particles 6 leaving the turbine 9 being preferably between 20 and 120 m/s, by spraying using, or into, a fluid by means of a lance 8 connected to a compressor delivering a pressure of between especially 0.5 and 15 bars, it being possible for the propelling fluid also to play a part in the dispersion of the dispersible liquid material 3. For example, water or a gas may be such a fluid.

The means for spraying the stream of solid particles 6 also include those using electrical, magnetic or electromagnetic entrainment.

With regard to the spraying parameters, the cumulative volume of the sprayed solid particles 6 preferably has a value of substantially one hundredth of to twice the volume of the liquid material 3 to be dispersed. The velocity, the particle size and the spraying energy, for their part, are controlled as a function of the desired dispersion and therefore of the particle size which is intended to obtained. Similarly, apart from the reactivity of the solid particles, these parameters will mean that the solid particles adhere or do not adhere to the dispersed liquid.

Quite obviously, the velocity and the energy of spraying are also a function of the nature of the solid particles 6. The latter may be identical or nonidentical in nature with that of the dispersible liquid material 3. They may, for example, be pulverulent products such as especially—no limitation being implied—beads of or powdered ceramic, metal, ice, solid carbon dioxide, synthetic substance, sand, gravel, chemical pulverulent products for alimentary, pharmaceutical, cosmetic or agricultural use, and the like.

In a possible application of the invention shot is employed for dispersing the jet 5 of liquid material 3. This shot may originate from a preceding casting or from the casting in progress, which comprises a recycling circuit. It is wetted with water before or during their ;atomization, for example, by being passed through a water curtain 14.

The stream of solid particles 6 may also be in the form of a mixture.

According to the invention the dispersion is improved by a phenomenon of liquefaction, vaporization or sublimation of the coating of the solid particles 6 or by a violent and/or explosive chemical reaction of the said coatings 6 with the dispersible liquid material 3.

The particles 7 of atomized liquid material which are obtained by making use of the process in accordance with the invention include powders, droplets, drops, wire, solid particles coated with the liquid material solidified on the said particles, all these particles having, in all cases, a diameter smaller than 100 mm. As for their composition, this may be either that of the dispersible liquid material or of the mixture of dispersible liquid, or a chemical composition originating from the reaction between the solid particles 6, of the same nature or not, and/or of the dispersible liquid material and/or of the receiving medium.

The invention will now be described with the aid of two examples, given without any limitation being implied, in the case where a liquid steel is used in a process in accordance with the present invention.

EXAMPLE 1

Dispersible liquid material: Steel
- casting jet diameter: 15 mm
- casting jet area: 176 $mm^2$
- velocity at impact: 4 m/s
- flow rate: $3\times10^5$ $mm^2/s$ Solid particles: WS 110 round shot (manufactured and marketed by the Wheelabrator Allevard company)
- diameter: 0.2 to 0.6 mm
- velocity: 60 m/s
- flow rate: 200 gls
- spraying using lance, P=6 bars,
- straight lance The atomizing parameters thus defined have resulted in the following being obtained:
- 42% of particles with a particle size of 0 to 700 $\mu$m
- 45% of particles with a particle size of 1.5 to 6 mm, capable of being atomized again

EXAMPLE 2

Figure 7:
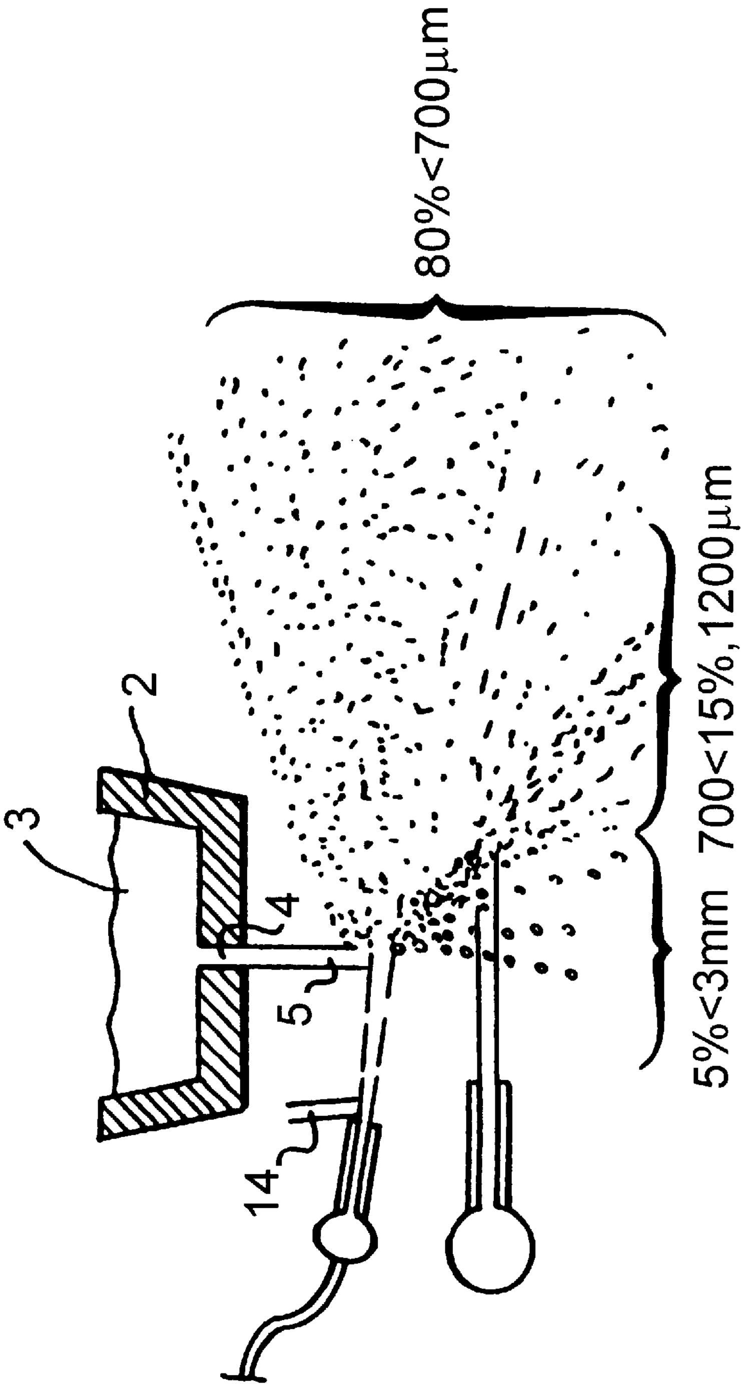
FIG. 7 is a diagrammatic view illustrating Example 2, described later.

(Illustrated by FIG. 7)

Dispersible liquid material identical with that of Example 1 above.

Solid particles also identical but pressure using lance at P=4 bars and particle velocity of 40 m/s.

Interposition of a water curtain of 20 mm thickness between the end of the nozzle and the jet of liquid steel.

Return of the least scattered particles using a second atomization with water alone (pressure approx. 1 bar).

According to this process the following are obtained:

80% of particles with a particle size of 0 to 700 $\mu$m,

15% of particles with a particle size of 700 to 1200 $\mu$m,

5% of particles with a particle size of between 1200 and 3000 $\mu$m which, although not widely scattered have escaped, at the sides, the return using the water jet.

EXAMPLE 3

Dispersible liquid material: zirconium Problem: to divide the material in order to carry out accurate additions in the making up of alloys (grinding is very difficult)

| | |
|---|---|
| casting jet diameter | 15 mm |
| casting jet area | 176 $mm^2$ |
| impact velocity | 3 m/s |
| flow rate | $4 \times 10^5$ $mm^3/s$ |

Solid particles: pieces of zirconium (manufactured by grinding and marketed by the Cezus company), covered with water

| | |
|---|---|
| diameter | 0.5 to 25 mm |
| velocity | 30 m/s |
| flow rate | 100 g/s |

spraying using turbine: ø250 mm, exit velocity 30 m/s

The atomization has resulted in the formation of beads and particles of 0.5 to 25 mm which can be employed for very accurate additions.

EXAMPLE 4

Dispersible liquid material: silicon metal

| | |
|---|---|
| casting jet diameter | 25 mm |
| casting jet area | 625 $mm^2$ |
| impact velocity | 3 m/s |
| flow rate | $1.5 \times 10^6$ $mm^3/s$ |

Solid particles: round steel shot from 4 to 20 mm quenched in liquid nitrogen

| | |
|---|---|
| velocity | 40 m/s |
| flow rate | 350 g/s |
| spraying using turbine: | ø 250 mm |

According to this process, particles of silicon metal are obtained (the steel shot is separated magnetically) with a particle size of 0.1 to 12 mm, of rapid-cooling structure, of interest to the electronics world.

Although modifications and changes may be suggested by those skilled in the art, in is the intention of the inventors to embody within the patent warranted hereon all changes and modifications as reasonably and properly come within the scope of their contribution to the art.

I claim:

1. A process for atomizing a dispersible liquid material comprising the steps of:

(a) providing a source of reactive solid particles which are at least partially coated with a coating material on a surface of the reactive solid particles:

(b) providing a source of dispersible liquid material:

(c) atomizing the dispersible liquid material into atomized particles by spraying at least one stream of reactive solid particles onto the dispersible liquid material, the reactive solid particles increasing the in-situ dispersion of the dispersible liquid material due to the rapid expansion of the coating material when the reactive solid particles are near or in contact with the dispersible liquid material; and (d) collecting the atomized particles.

2. The process of claim 1, wherein the reactive solid particles are completely coated.

3. The process of claim 1, wherein the reactive solid particles are coated with a layer of coating material.

4. The process of claim 3, wherein the coating material comprises drops of the coating material.

5. The process according to claim 1 at wherein the rapid expansion of the coating material corresponds to its sublimation or evaporation.

6. The process of claim 1, wherein the at least one stream of reactive solid particles is sprayed onto a surface of a bath of the dispersible liquid material.

7. The process according to claim 1, wherein the at least one stream of reactive solid particles is sprayed onto an outflow by overspill of a bath of dispersible liquid material.

8. The process according to claim 1, wherein the at least one stream of reactive solid particles is sprayed onto a jet of the dispersible liquid material obtained by an outflow of the dispersible liquid material through an opening.

9. The process according to claim 1, wherein the at least one stream of reactive solid particles is sprayed under immersion into a bath of the dispersible liquid material.

10. The process of claim 1 comprising the additional step of atomizing a dispersed dispersible liquid material.

11. The process of claim 10, wherein the additional atomizing step takes place before step (a).

12. The process of claim 11, wherein the additional atomizing step takes place after step (a).

13. The process according to claim 1, wherein the reactive solid particles and the dispersible liquid material are identical in nature.

14. The process according to claim 1, wherein the at least one stream of reactive solid particles is directed onto a free surface of the dispersible liquid material.

15. The process of claim 1, wherein a plurality of streams of reactive solid particles are sprayed onto the dispersible liquid material.

16. The process according to claim 1, wherein the cumulative volume of the sprayed reactive solid particles amounts to one hundredth of twice the volume of the liquid material to be dispersed.

17. The process of claim 1, characterized in that the stream of reactive solid particles is sprayed using gravity.

18. The process of claim 1, characterized in that the stream of reactive solid particles is created by action of a mechanical device on the reactive coated solid particles.

19. The process of claim 18, characterized in that the mechanical device is a turbine.

20. The process according to claim 19 characterized in that the velocity of the reactive solid particles leaving the turbine is between 20 and 120 m/s.

21. The process of claim 1, characterized in that the stream of reactive solid particles is sprayed by propulsion by or in a fluid.

22. The process according to claim 21, characterized in that the propulsion by or in the fluid takes part in the dispersion of the dispersible liquid material.

23. The process according to claim 21, characterized in that the pressure of the propulsion field is between 0.5 and 15 bars.

24. The process according to claim 1, characterized in that the reactive solid particles are sprayed by electrical, magnetic or electromagnetic entrainment.

25. The process according to claim 1, characterized in that the reactive solid particles are chosen from pulverulent products.

26. The process according to claim 25, characterized in that the pulverulent products include a component selected from the group consisting of beads of ceramic, powdered ceramic, metal, ice, solid carbon dioxide, synthetic material, sand, gravel and chemical products.

27. The process according to claim 1, characterized in that the dispersion is improved by an electrical and/or magnetic interaction or by a violent and/or explosive chemical reaction of the said coatings with the dispersible liquid material.

28. The process according to claim 1, characterized in that the dispersible liquid material is a metal or an alloy.

29. The process according to claim 1, characterized in that the dispersible liquid material is steel.

30. The process according to claim 1, characterized in that the dispersible liquid material is a material selected from the group consisting of zirconium, aluminum, silicon or one of their alloys.

31. A process for atomizing a dispersible liquid material comprising the steps of:

(a) atomizing the dispersible liquid material by spraying at least one stream of reactive solid particles onto the dispersible liquid material to cause the dispersible liquid material to atomize into particles, the reactive solid particles being at least partially coated with a coating material that increases in situ dispersion of the dispersible liquid material due to a rapid expansion when the reactive solid particles are near or in contact with the dispersible liquid material; and (c) collecting the particles.

32. A process for atomizing a dispersible liquid material comprising the steps of:

(a) atomizing the dispersible liquid material by spraying at least one stream of reactive solid particles onto the dispersible liquid material, the dispersible liquid material selected from the group consisting of zirconium, aluminum, silicon and alloys of the foregoing, the reactive solid particles being pulverulent solid products selected from the group consisting of beads of ceramic, powdered ceramic, metal, ice, solid carbon dioxide, sand and gravel the reactive solid particles being at least partially coated with a reactive coating material that decreases in situ dispersion of the dispersible liquid material due to a rapid expansion when the coated solid particles are near or in contact with the dispersible liquid material; and (b) collecting the particles.

33. The process according to claim 32, wherein step (b) occurs before step (a).

* * * * *